US007748108B2

(12) United States Patent
Cassar

(10) Patent No.: US 7,748,108 B2
(45) Date of Patent: Jul. 6, 2010

(54) TOOL FOR CRIMPING A CONTACT ONTO A CABLE

(75) Inventor: Thierry Cassar, Angerville la Campagne (FR)

(73) Assignees: Airbus France, Toulouse (FR); Connecteurs Electriques Deutsch, Evreux (FR)

( * ) Notice: Subject to any disclaimer, the term of this patent is extended or adjusted under 35 U.S.C. 154(b) by 582 days.

(21) Appl. No.: 11/571,932

(22) PCT Filed: Jul. 12, 2005

(86) PCT No.: PCT/EP2005/007548

§ 371 (c)(1), (2), (4) Date: Jan. 11, 2007

(87) PCT Pub. No.: WO2006/012979

PCT Pub. Date: Feb. 9, 2006

(65) Prior Publication Data

US 2008/0028602 A1 Feb. 7, 2008

(30) Foreign Application Priority Data

Jul. 26, 2004 (FR) .................................. 04 08231

(51) Int. Cl.
*B23P 19/00* (2006.01)
*H01R 43/42* (2006.01)

(52) U.S. Cl. ............................ 29/753; 29/758; 29/863; 72/402

(58) Field of Classification Search .................. 29/747, 29/751, 753, 754, 758, 761, 857, 861–863; 72/402, 404, 409.01, 409.09, 409.14, 412, 72/416

See application file for complete search history.

(56) References Cited

U.S. PATENT DOCUMENTS

| | | | | |
|---|---|---|---|---|
| 2,002,502 | A | 5/1935 | Douglas | |
| 2,985,047 | A | 5/1961 | Van Oort | |
| 3,094,702 | A * | 6/1963 | Haucke et al. | 72/402 |
| 3,713,322 | A | 1/1973 | Fischer | |
| 5,499,448 | A | 3/1996 | Tournier et al. | |
| 5,546,653 | A | 8/1996 | Tournier et al. | |
| 6,513,235 | B1 * | 2/2003 | Ohsumi et al. | 29/753 |
| 7,162,909 | B2 * | 1/2007 | Kelly et al. | 29/751 |
| 2004/0072378 | A1 | 4/2004 | Kelly et al. | |

FOREIGN PATENT DOCUMENTS

| | | |
|---|---|---|
| FR | 1 240 942 | 8/1960 |
| FR | 2 686 459 | 7/1993 |
| FR | 2 708 150 | 1/1995 |
| FR | 2 710 788 | 4/1995 |
| WO | 2004 021523 | 3/2004 |

* cited by examiner

*Primary Examiner*—Donghai D. Nguyen
(74) *Attorney, Agent, or Firm*—Oblon, Spivak, McClelland, Maier & Neustadt, L.L.P.

(57) ABSTRACT

A crimping tool to crimp a contact onto the end of a wire, the contact configured to receive both a stripped part and an insulated part of the wire end. The crimping tool includes a first and second tier to crimp the contact onto the conductor core and onto the insulating jacket of the wire respectively. A mechanism actuates the first and second tiers in substantially a simultaneous manner. At least one rotating element is arranged between at least one crimping component and a cam of at least one of the tiers, the rotating element possibly taking up at least two positions with respect to the crimping component. A crimping method crimps a contact both onto an insulating jacket of a wire and onto its conductor core.

25 Claims, 6 Drawing Sheets

TOOL FOR CRIMPING A CONTACT ONTO A CABLE

BACKGROUND OF THE INVENTION

1. Field of the Invention

The subject of the invention is a tool for crimping a contact onto the end of an electric wire. It also relates to method for crimping a contact onto the end of an electric wire.

2. Discussion of the Background

Most modern aircraft comprise a large number of electric wires. These wires generally consist of a conductor core in copper surrounded by an electrically insulating jacket. Conventionally, the ends of the copper wires are stripped and a connector contact is crimped onto the conductor core of each of said ends, to allow the electric connecting of the wires. Given the number of wires and length of wiring required when building an aircraft the weight of said wiring may reach several hundred kilograms on a modern civil passenger aircraft, i.e. the equivalent of several passengers. To improve aircraft performance, it would be of interest to replace at least part of the copper wires by aluminium wires which are lighter than copper wires. Like copper wires, aluminium wires consist of a conductor core in aluminium surrounded by an insulating jacket generally in plastic material.

For the electrical connection of aluminium wires, it is desirable to place a connector contact on each end of said wires. The use of contacts similar to those used on copper wires do not give satisfaction since these contacts are crimped solely onto the conductor core, which may therefore be partly in contact with ambient air. Aluminium is a metal which oxidizes much faster than copper when in contact with air. In addition, aluminium oxide forms an electrically insulating layer which might therefore be detrimental to the electric continuity between the conductor core of the wire and said connector contact crimped onto its end.

One known manner for solving this problem consists of using a contact comprising a first part able to be crimped onto the conductor core and a second part able to be crimped air-tight fashion onto the insulating jacket. Therefore once the contact is crimped on the end of the aluminium wire, the conductor core is no longer in contact with ambient air, avoiding the above-mentioned oxidation problems. Patents FR 2 686 459, FR 2 708 150 and FR 2 710 788 concern methods or connecting a wire to a contact and a crimping tool for said contact, suitable for aluminium wires. However, they require the use of contacts having a partly truncated outer surface and are therefore not adapted for contacts of outer cylindrical shape, at least regarding the parts to be crimped.

Patents FR 1 240 942 and U.S. Pat. No. 2,985,047 relate a tool with which it is possible, in one embodiment, to crimp a contact onto both the conductor core of a wire and a non-stripped part of its insulating jacket. This tool comprises hinged jaw blades forming two tiers actuated simultaneously, one ensuring crimping of the contact on the conductor core and the other ensuring crimping of the contact on the insulating jacket. However that part of the contact crimped onto the insulating jacket has a section whose perimeter comprises three planar sides arranged substantially in a triangle, connected together by concave parts. The shape of this section is not suitable for contacts of connectors used in aeronautics in particular since, with the tools used for inserting and removing said contacts in and from these connectors, the section of the contacts crimped onto the insulating jacket must be substantially elliptical and preferably circular. In addition, when crimping contacts onto the insulating jacket, best air-tightness is obtained with contacts whose section is substantially elliptical and preferably circular. The crimp of said contact on the conductor core preferably has a section comprising concave parts distributed over its perimeter to obtain good characteristics of resistance to mechanical traction and good electrical connection characteristics. This crimping must be conducted substantially simultaneously with crimping of said contact onto the insulating jacket to obtain firstly best air-tightness properties with protection against oxidation and secondly to guarantee a repeat distance between crimping on the conductor core and crimping on the insulating jacket.

U.S. Pat. No. 3,713,322 relates to a tool which can be used to crimp a contact along a substantially circular section. However, this tool can only achieve one crimp operation at a time, and is therefore not suitable either for crimping a connector contact onto an aluminium wire.

Patent applications US 2004/072378 and WO 2004/021523 describe a tool comprising two crimping tiers which can be used to crimp a contact both onto the conductor core of a wire and onto the insulating jacket of this wire simultaneously. However, owning in particular to the juxtaposition of two crimping tiers, said tool requires strong forces on the compression handles. These forces are higher, the greater the diameter of the wire. They are a particular hindrance when the tool returns to its rest position on completion of crimping. In addition, said forces may cause rapid wear of some tool parts.

SUMMARY OF THE INVENTION

These problems are solved at least in part in the invention with a tool for crimping a contact onto the end of a wire, said wire end comprising a stripped part where the conductor core of the wire is exposed, and an insulated part where this conductor core is covered by insulating material, said contact comprising a hole coaxial to the longitudinal axis of said contact and able to receive both said stripped part and said insulated part of the wire end, said crimping tool comprising:

- a first tier to crimp a first part of said contact onto the conductor core of the wire;
- a second tier to crimp a second part of said contact onto the insulating jacket of the wire; and
- means for actuating said first and second tiers in substantially simultaneous manner;

wherein:

- said first and second tiers comprise crimping components to be moved relative to the contact to be crimped, during the crimping operation;
- at least one of said first and second tiers comprises a cam cooperating with the crimping components of the tier under consideration and moving the latter so that they crimp the contact, during the crimping operation, this tool also being remarkable in that at least one rotating element is arranged between at least one of said crimping components and said cam, this rotating element possibly taking up at least two positions with respect to the crimping component under consideration so that when this rotating element is in contact both with this crimping component and with said cam the distance between said cam and one end of this crimping component, able to touch said contact for its crimping, is different in said at least two positions.

Preferably, this tool is designed so that when the cam moves relative to the crimping components, in a first direction corresponding to crimping, said rotating element takes up a first position with respect to said crimping component in which said distance is maximal, and when the cam moves relative to the crimping components in a second direction opposite to the first direction, said rotating element takes up a second position with respect to said crimping component, in which said distance is minimal.

Consequently, since this distance is minimal at the time the tool returns to its rest position after crimping, the crimping component under consideration exerts a lesser force on the crimped contact than the force exerted at the time of crimping, and even no force at all. Therefore the friction resulting from cooperation between said crimping component and the cam is lower when the tool returns to its rest position. A first advantage arising therefrom is that lesser forces need to be applied to the means for actuating the first and second tiers. Also, another advantage is related to the fact that this reduction in friction also makes it possible to reduce wear of the parts under consideration.

In one preferred embodiment, said second tier comprises means able to achieve crimping of substantially elliptical section.

In addition, the crimping components of the first and/or second tiers are jaws able to be moved radial fashion with respect to the contact to be crimped, during the crimping operations.

Also according to this preferred embodiment, said cam is mounted rotatably about a jaw support, said cam comprising a track which cooperates with ends of the jaws to cause them to move radially towards the contact to be crimped, during crimping, these jaws being slidingly mounted in grooves of the jaw support.

With this tool it is therefore possible to crimp the contact onto the conductor core of the wire and onto the insulating jacket simultaneously, the crimp on the insulating jacket having a substantially elliptical or circular section, providing both a good air seal and hence protection of the conductor core crimp against oxidation, and compatibility with the tools for connector contact insertion/removal used in aeronautics in particular.

In this preferred embodiment, at least one rotating element is arranged between at least one jaw end and said track, this rotating element possibly taking up at least two positions with respect to the jaw end under consideration, so that when this rotating element is in contact both with this jaw end and with said track the distance between said track and another end of this jaw, able to touch said contact for its crimping, is different in said at least two positions.

Also, advantageously, the crimping tool is designed so than during a rotation of the cam about the jaw support in a first direction corresponding to a crimping operation, said rotating element takes up a first position with respect to said jaw end, in which said distance is maximal, and during a rotation of the cam about the jaw support in a second direction opposite to the first direction, said rotating element takes up a second position with respect to said jaw end, in which said distance is minimal. This makes it possible to reduce friction forces on the cam track when the tool returns to its rest position after a crimping operation.

In a first variant of embodiment, said rotating element is a substantially spherical bead.

In a second variant of embodiment, said rotating element is a substantially cylindrical roller.

In one particular embodiment this second variant, said roller is secured to a hinge pin, coaxial to this roller, and whose ends are able to slide within rails secured to said jaw end.

Advantageously, said cam track comprises a notch at each position of said track facing each jaw with which a rotating element is associated when said cam has reached its travel limit relative to the jaw support, during crimping. These notches facilitate the changing of said rotating elements from said first position to said second position at the end of crimping, in order to reduce friction on the cam track when the crimping tool returns to its rest position.

In one embodiment of the invention, the shape of said track is such that it is able to allow a centrifugal radial movement of the jaws at the end of crimping, so as to release these jaws from said contact.

Preferably, the jaw supports are secured to a first handle and the cams are secured to a second handle, said first handle and second handle being common to the first tier and second tier.

Also preferably, the second tier comprises two groups of two jaws such that:

- the jaws of the first group have ends able to touch the contact to be crimped, whose shape substantially corresponds to a plane whose orientation is substantially tangent to this contact during crimping;
- the jaws of the second group have ends able to touch the contact to be crimped, whose concave shape substantially corresponds to the arc of a cylinder, smaller than a semi-cylinder;
- the two jaws of the first group are arranged diametrically opposite either side of a hole in the jaw support able to receive the contact to be crimped;
- the two jaws of the second group are arranged diametrically opposite either side of said hole in the jaw support able to receive the contact to be crimped;
- the jaws of the second group are oriented at an angle substantially equal to 90 degrees with respect to the jaws of the first group.

This embodiment of the second tier allows the contact to be crimped on the insulating wire jacket along a crimping section that is substantially oval or circular so that heed can be given to required characteristics regarding air-tightness and the possible use of the above-cited tools for insertion and removal of the contacts in the connectors.

Advantageously, said first tier comprises means able to achieve a crimp whose section has concave parts on its perimeter. This allows the contact to be crimped onto the conductor core of the wire with satisfactory characteristics regarding mechanical traction resistance and electrical connection between the conductor core of the wire and this contact.

In one particular embodiment, the first tier comprises four identical jaws such that:

- two adjacent jaws are offset from each other by an angle of substantially 90 degrees;
- two jaws other than adjacent jaws are arranged diametrically opposite either side of a hole in the jaw support able to receive the contact to be crimped;
- the ends of said jaws able to touch the contact to be crimped have a convex shape able to indent concave deformation in this contact during crimping.

This embodiment of the first tier therefore allows crimping of the contact onto the wire conductor core to be obtained with the required characteristics of electrical connection and resistance to mechanical traction.

However the invention is not limited to first and second crimping tiers comprising jaws which move radial fashion relative to the contact to be crimped.

The invention also concerns a method for crimping a contact onto the end of a wire, said wire end comprising a stripped part where a conductor core of the wire is exposed and an insulated part where this conductor core is covered by an insulating jacket, said contact comprising a hole coaxial to the longitudinal axis of said contact able to receive both said stripped part and said insulated cart of the wire end, wherein, said contact is inserted both in a first tier and in a second tier of a crimping tool, the tiers being arranged so that:

the first tier faces a first part of said contact surrounding the conductor core of the wire;

the second tier faces a second part of said contact surrounding the insulating jacket of the wire;

said first and second tiers are actuated in substantially simultaneous manner;

the actuation of the second tier comprises two successive steps:

two first jaws of the second tier, diametrically opposite either side of the contact to be crimped, the ends of these jaws touching this contact during crimping being substantially planar, are actuated until said contact is deformed along a substantially oval section, said first jaws are held in position on the contact and two second jaws of the second tier are actuated which lie diametrically opposite either side of the contact to be crimped and oriented with respect to the first jaws at an angle of substantially 90 degrees, their ends touching this contact during crimping being of concave shape substantially corresponding to the arc of a cylinder smaller than a semi-cylinder, these second jaws being actuated until said contact is deformed along a substantially circular section, said method also being remarkable in that on completion of crimping, the jaws of at least one tier are at least partly released under the effect of the movement of at least one rotating element cooperating with a bevelled end of at east one of said jaws, so as to reduce the forces needed to bring the crimping tool back to its rest position.

The invention also concerns an electric contact crimped according to this method, and an electrical contact crimped using a crimping tool such as mentioned above. It also concerns an aircraft comprising said electric contacts.

BRIEF DESCRIPTION OF THE DRAWINGS

The invention will be better understood on reading the following description and examining the appended figures. In these figures identical references designate similar parts.

In FIG. 11*a*, the jaw is seen in a plane perpendicular to the rotational axis of the jaw support, as in FIG. 2. FIG. 11*b* is a cross-sectional view along line B-B in FIG. 11*a*.

In FIG. 12*a* the jaw is seen in a plane perpendicular to the rotational axis of the jaw support as in FIG. 2. FIG. 12*b* is a cross-sectional view along line C-C in FIG. 12*a*.

DETAILED DESCRIPTION OF THE PREFERRED EMBODIMENTS

Figure 3:
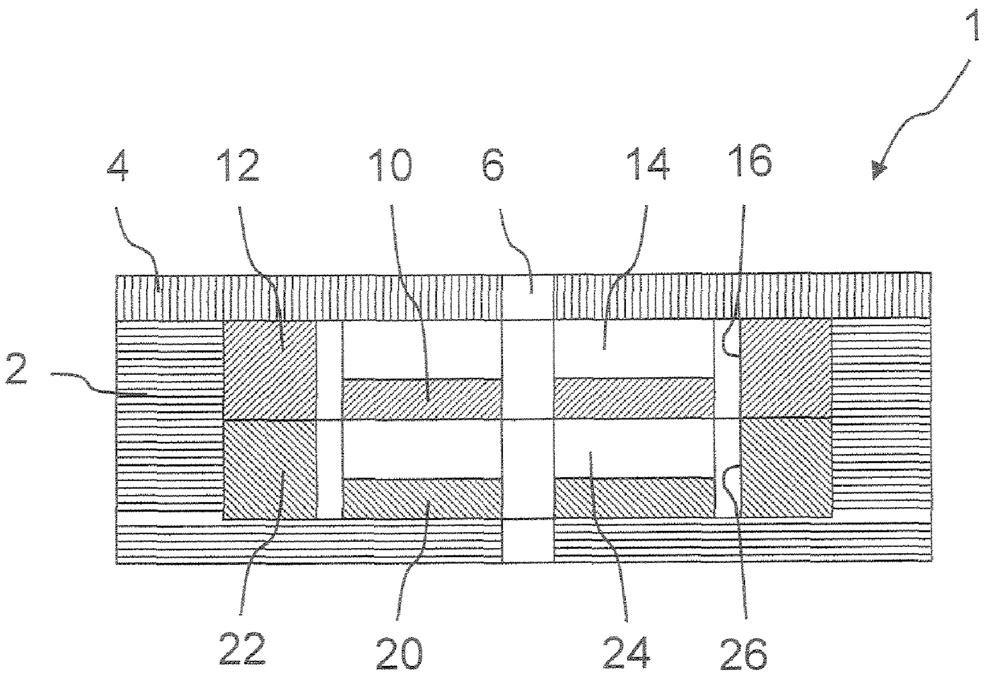
FIG. 3 is a cross-sectional view, along line A-A in FIG. 1, of an inventive crimping tool. For reasons of clarity the jaws of the two tiers are not shown.

FIG. 3 shows a crimping tool 1 of the invention, comprising first tier and a second tier. The first tier comprises a jaw support 10 of cylindrical shape. A ring-shaped cam 12 is rotatably mounted about said jaw support 10. The inner side of this ring forms a track 16. The jaw support 10 comprises grooves 14 radial to the axis of said jaw support of cylindrical shape, which are each able to receive a jaw 18, as shown FIG. 4. This jaw can slide in the corresponding groove 14. Similarly, the second tier comprises a jaw support 20 of cylindrical shape. A ring-shaped cam 22 is mounted rotatably about said jaw support. The inner side of this ring forms a track 26. The jaw support 20 comprises grooves 24 radial to the axis of said cylindrical-shaped jaw support, which are each able to receive a jaw 28 as shown FIG. 4. This jaw can slide in the corresponding groove 24. The first tier and the second tier are superimposed so that the axes of rotation of the two cams 12 and 22 merge together and with the axes of the cylindrical-shaped jaw supports 10 and 20. The jaw supports 10 and 20 are secured to a first handle 4. The cams 12 and 22 preferably have an outer cylindrical shape and are secured to a second handle 2 of the crimping tool 1. These two handles 2 and 4 cooperate together to ensure the guiding in rotation of cams 12 and 22 about the jaw supports 10 and 20. A hole 6 coaxial to said rotation axes is provided in the jaw supports 10 and 20 and in the handles 2 and 4 to allow insertion of the contact to be crimped between the jaws 18, 28 of the first and second tiers.

Figure 4:
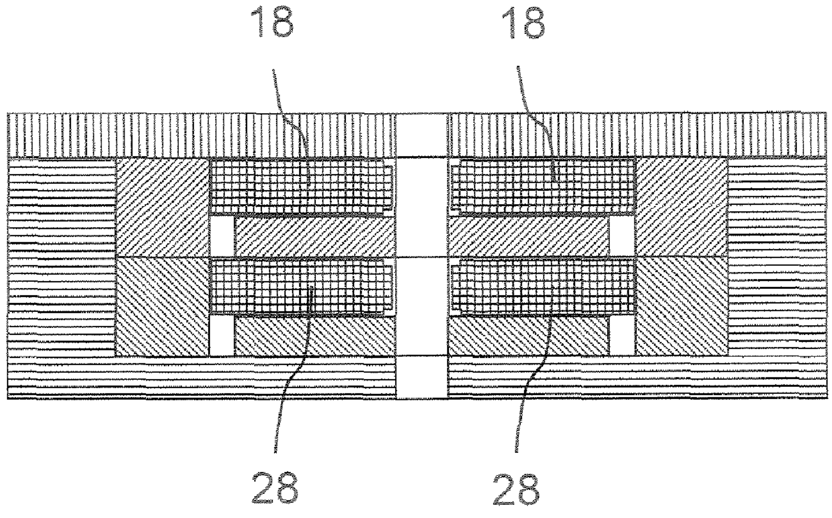
FIG. 4 is a cross-sectional view similar to FIG. 3, in which the jaws of the two tiers are shown.

In FIGS. 3 and 4 the first tier and the second tier are shown to be of substantially identical size. However, this illustration is not to be given a limited interpretation, said first and second tiers each possibly having different dimensions.

Figure 1:
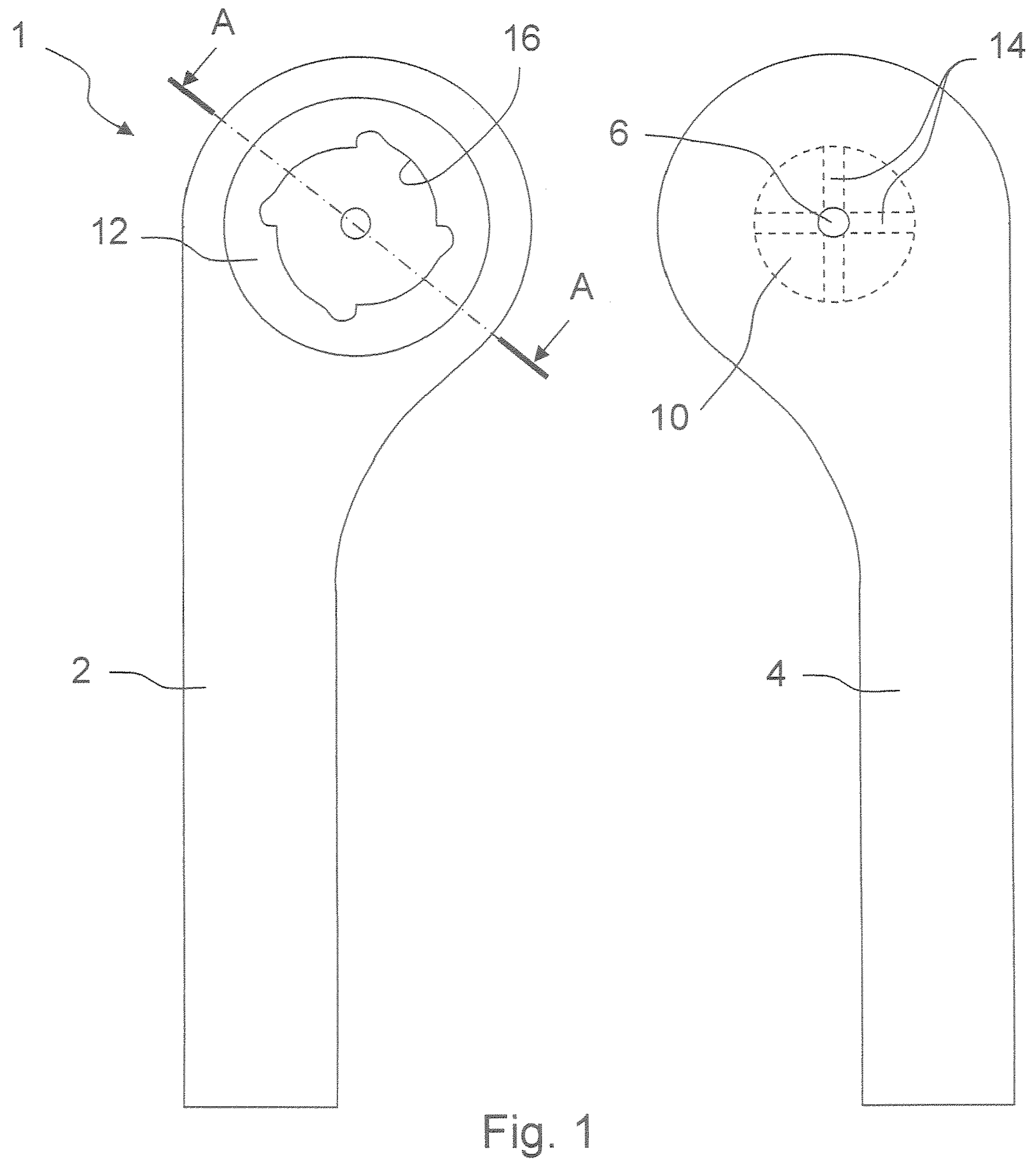
FIG. 1 a planar general exploded view of an inventive crimping tool.
Figure 2:
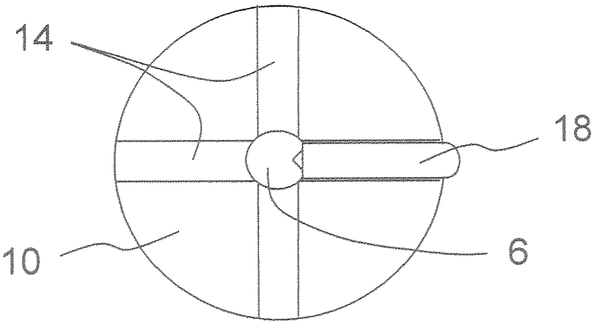
FIG. 2 is a detailed view of a jaw support in one crimping tier.

The crimping tool 1 is shown in a planar exploded view in FIG. 1. The cam 12 of the first tier is seen to be secured to the second handle 2. For reasons of clarity the cam 22 of the second tier is not shown. The jaw support 10 of the first tier is shown to be secured to the first handle 4. For reasons of clarity the jaw support 20 of the second tier, also secured to said first handle, is not shown. The jaw support 10 of the first tier is shown in more detail FIG. 2. It comprises grooves 14 radial to its axis and hence also radial to the axis of the contact to be crimped when the contact is inserted in hole 6 of the crimping tool. In the preferred embodiment shown in said figure, said jaw support comprises four grooves 14; these are arranged two-by-two and diametrically opposite with respect to the axis of the jaw support, and two adjacent grooves are offset from each other by an angle of substantially 90 degrees. Each of said grooves receives a jaw 18 able to slide in this groove. For reasons of clarity only one of said jaws is shown in the figure.

Figure 5:
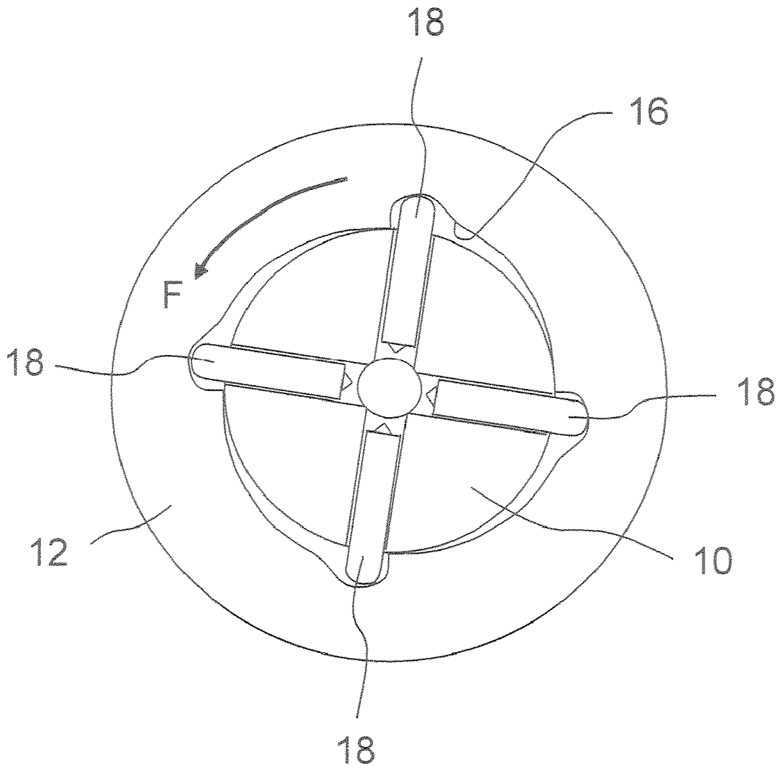
FIG. 5 shows a crimping tier of an inventive tool, in rest position.
Figure 6:
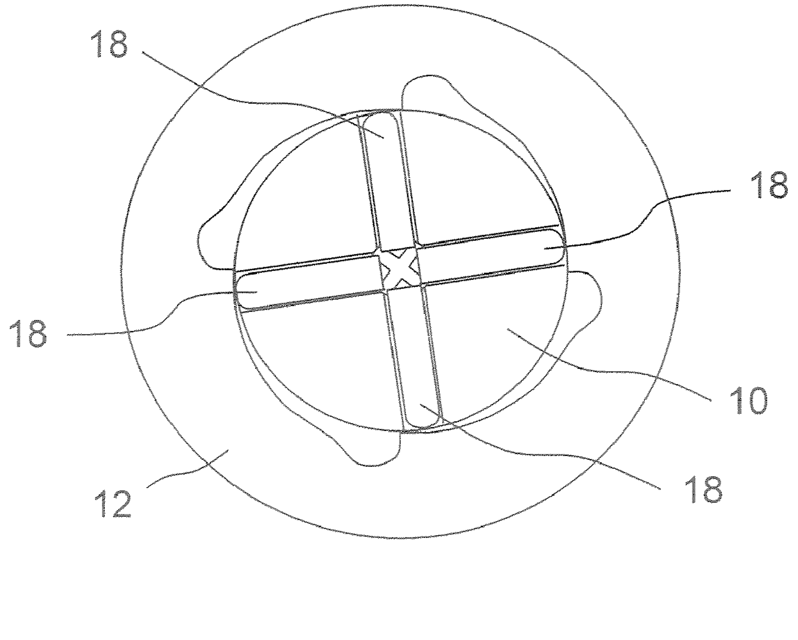
FIG. 6 shows the crimping tier corresponding to FIG. 5, in crimping position.

In FIG. 5 the jaw support 10 of the first tier, equipped with four jaws 18, is shown surrounded by cam 12 in rest position. The track 16 of this cam is conformed to cooperate with ends of jaws 18 to allow displacement of said jaws radial to the axis of rotation of the jaw support 10, towards this axis of rotation, when said cam rotates about the jaw support in the direction of arrow F, during crimping. As shown FIG. 6, at the end of crimping, ends of jaws 18 lying opposite said ends of said jaws cooperating with track 16, are therefore moved into the hole to crimp the contact.

Figure 7:
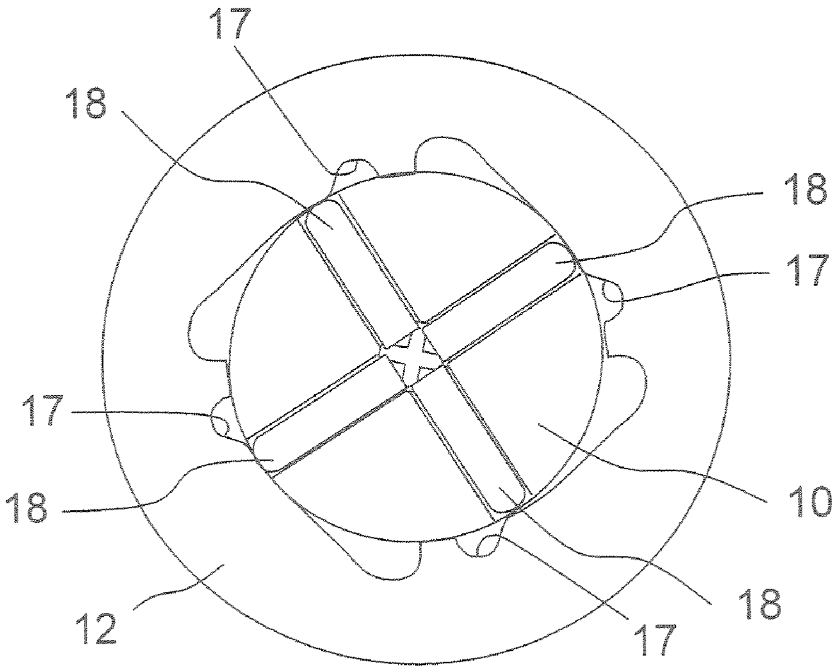
FIG. 7 shows a variant of the crimping tier corresponding to FIGS. 5 and 6, in crimping position.
Figure 8:
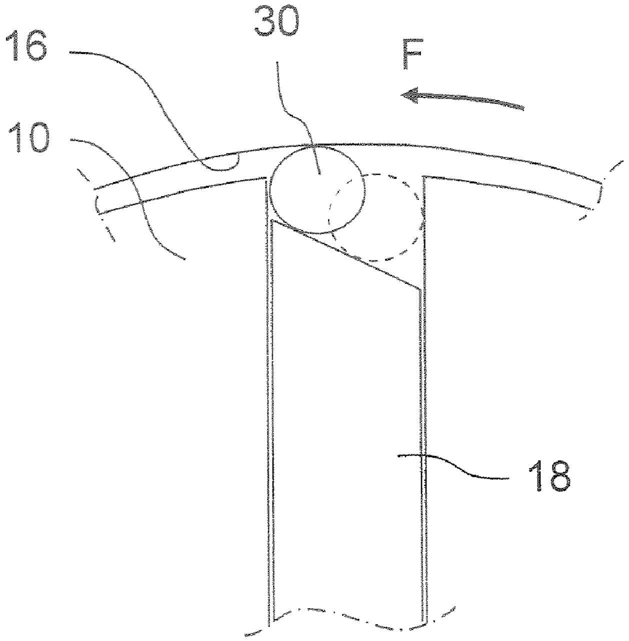
FIG. 8 relates to a crimping tier of the invention and shows a rotating element in detail located between one end of a jaw sliding in a jaw support of said crimping tier and a cam track.

As shown FIG. 8, the ends of jaws 18 cooperating with the track 16 are bevelled and a rotating element 30 is arranged between each bevelled edge and the track 16. The rotating elements 30 are not shown FIGS. 5, 6 and 7 for the clarity of said figures. The bevelled edge of a jaw 18 is made so that the distance between this jaw and said track is maximal at the rear of said jaw and minimal at the front, the notions of front and rear being consideration in relation to the direction of movement indicated by arrow F of the cam 12 (and hence of track 16) relative to the jaw support 10 (and hence to the jaw 18) during crimping. At the time of crimping, under the effect of friction forces of the rotating element 30 on track 16, this rotating element takes up a first position shows as a solid line FIG. 8 and located at the front of jaw 18. When the crimping tool returns to its rest position after crimping, the cam 12 is moved in opposite direction to the direction of crimping indicated by arrow F. Under the effect of friction forces of the rotating element 30 on track 16, this rotating element then takes up a second position shown as a dotted line FIG. 8 and located at the front of jaw 18 at the time of said return to rest position; this second position is therefore located at the rear of jaw 18 when considering movement of the cam 12 (and hence of track 16) relative to the jaw support 10 (and hence to the jaw 18) in the direction of arrow F during crimping. In this manner the distance, between the track 16 and the end of jaw 18 able to touch the contact to be crimped, is maximal during crimping and minimal at the time of return to rest position. This is highly advantageous since the forces due to friction on track 16 are considerably reduced at the time of return to rest position compared with what they would be if one end of jaw 18 was directly in contact with this track or even if one non-bevelled edge of this jaw was in contact with track 16 via a rotating element.

Said rotating element can in particular be a bead, preferably substantially spherical, or a roller, preferably substantially cylindrical. If it is a roller, in one particular embodiment not shown, is roller may be secured to a hinge pin whose ends are able to slide in rails provided at the end of the jaw under consideration, the orientation of said rails substantially corresponding to the above-mentioned bevelled shape of the end of jaw 18. This embodiment is very advantageous since it also allows friction forces to be reduced even during crimping, since said roller can rotate about its axis without rubbing against said jaw end.

Figure 9A:
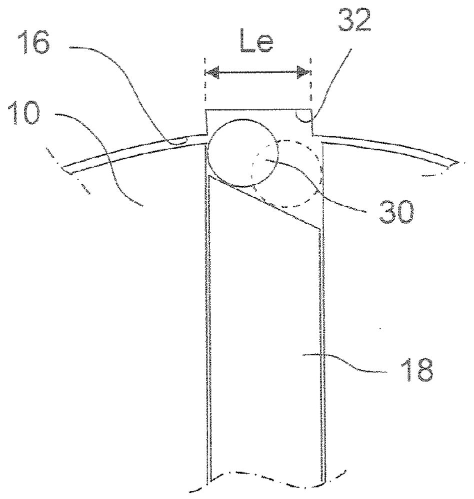
FIG. 9*a* is similar to FIG. 8 and shows a preferred embodiment in which a notch is provided in the cam track.
Figure 9B:
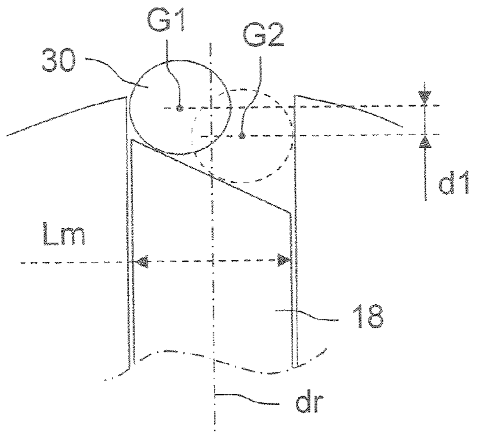
FIG. 9*b* gives more details of the rotating element and the jaw end shown FIG. 9*a*.

In one preferred embodiment of the invention shown FIG. 9*a*, the track 16 comprises notches 32 at positions of said track facing each of the jaws 18 when the cam 12 has reached its travel limit relative to the jaw support 10 during crimping. Each of said notches 32 may for example correspond to a groove, substantially perpendicular to the plane in FIG. 9*a*, made in said track 16; without departing from the scope of the invention, they may also correspond to a blind hole made in track 16. This is very advantageous since, at the end of crimping, the rotating element 30 is no longer in contact with the track 16 due to the presence of said notch. In this way, the rotating element 30 is no longer subject to friction forces against this track 16 and can therefore easily change from said first position (corresponding to crimping) to said second position (corresponding to return of the crimping tool to rest position). The depth of this notch 32 in track 16 is preferably determined giving consideration to the elastic deformation of the contact to be crimped: this depth is at least equal to the displacement of the jaw 18 under the effect of the elastic deformation of said contact, at the end of crimping, when this jaw is no longer subject to forces applied by means of said rotating element 30. This guarantees that the rotating element 30 is released of friction forces on track 16. Also preferably, the depth of said notch 32 is less than the difference in distance d1, considered when projecting onto a straight line dr radial to the axis of the jaw support 10 passing through jaw 18, between positions G1 and G2 respectively taken up by the centre of gravity of the rotating element 30 in said first position and in said second position shown FIG. 9*b*. In this manner, it is guaranteed that the jaw 18 will not come to re-crimp the contact when the crimping tool returns to its rest position. Another advantage of said notch 32 arises from the fact that the length Le it occupies on track 16 is preferably no more than substantially the width Lm of jaw 18, said notch also being located at a position on track 16 corresponding to the end of crimping. On this account, the length of track 16 used for actual crimping is not substantially reduced owing to the presence of said notch. Consequently, it is possible to conform said track 16 so as to distribute contact crimping forces throughout the entire crimping movement, while benefiting from the above-mentioned advantages of said notch 32 and said rotating element 30 regarding reduced friction forces, in particular when the crimping tool 1 returns to rest position.

In one embodiment shown FIG. 7, said track 16 comprises parts 17 enabling centrifugal radial movement of the jaws so as to release the jaws from the contact at the end of crimping. Said part 17 is provided at positions of said track facing each of the jaws when said cam has reached its travel limit in relation to the jaw support, during crimping.

The different embodiments described above regarding the first tier may evidently be applied both to the first tier and to the second tier.

Figure 10A:
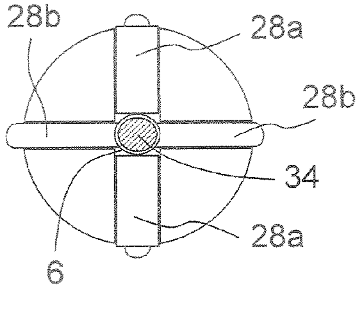
FIGS. 10*a*, 10*b* and 10*c* show a second tier according to the invention respectively in rest position, during crimping, and at the end of crimping.
Figure 10B:
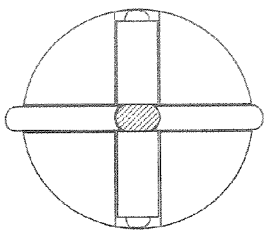
Figure 10C:
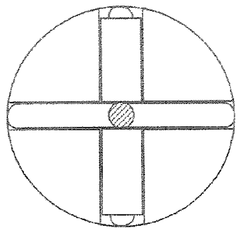

In one particular embodiment shown FIG. 10*a*, the second tier comprises two groups of two jaws. The jaws 28*a* of the first group have ends able to touch the contact to be crimped, their shape substantially corresponding to a plane whose orientation is substantially tangent to this contact during crimping. The jaws 28*b* of the second group have ends able to touch the contact to be crimped, their concave shape substantially corresponding to an arc of a cylinder smaller than a semi-cylinder. The two jaws 28*a* of the first group are arranged diametrically opposite either side of the hole 6 in the jaw support 20 able to receive the contact to be crimped 34, and the two jaws 28*b* of the second group are arranged diametrically opposite either side of said hole 6 in said jaw support 20 able to receive the contact to be crimped. In addition, the jaws 28*b* of the second group are oriented at an angle of substantially 90 degrees with respect to jaws 28*a* of the first group. The lengths of jaws 28*a* of the first group and of the jaws 28*b* of the second group, and the shape of the track 26, are advantageously provided so that during crimping:

- during a first step, said jaws 28*a* of the first group are moved radially towards the contact 34 to be crimped, without the jaws 28*b* of the second group being substantially displaced, as shown FIG. 10*b*. The effect is to flatten the contact 34 on two opposite sides corresponding to the planar ends of the two jaws 28*a* so that the section of said contact is substantially oval;
- during a second step the jaws 28*b* of the second group are moved radially towards contact 34 for its crimping, the jaws 28*a* of the first group being maintained substantially in the position they occupied at the end of said first step as shown FIG. 10*c*. The effect is to impart an initial, substantially elliptical shape to contact 34, which preferably becomes substantially circular at the end of crimping.

Figure 11A:
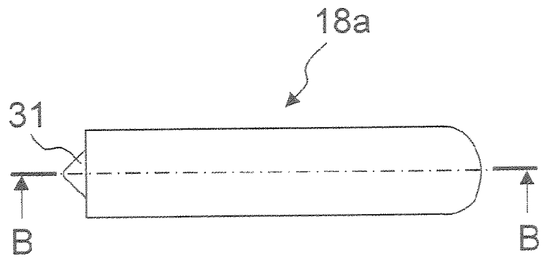
FIGS. 11*a* and 11*b* show an embodiment of a jaw of a first tier according to the invention.
Figure 11B:
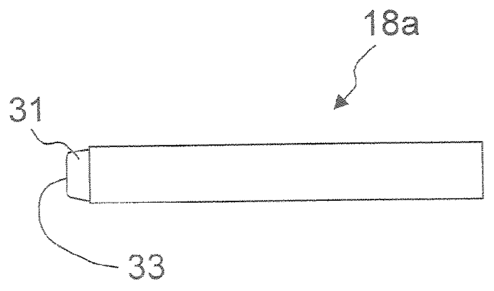
Figure 12A:
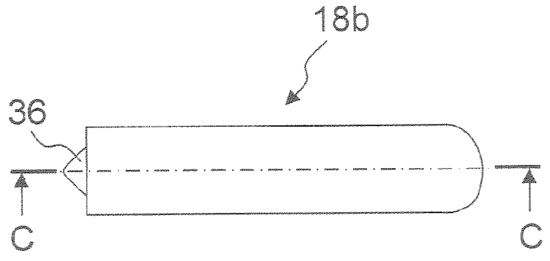
FIGS. 12*a* and 12*b* show another embodiment of a jaw of a first tier according to the invention.
Figure 12B:
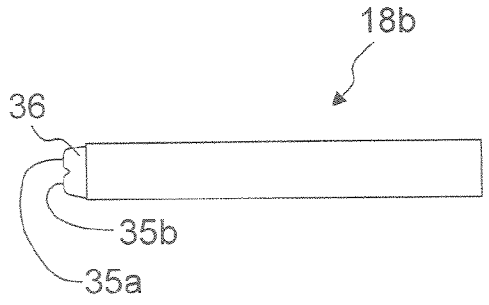

Regarding the first tier, this tier preferably comprises our identical jaws, able to achieve a contact crimp whose section comprises concave parts on its perimeter. Each of said jaws may in particular be:

of jaw type 18*a* shown FIGS. 11*a* and 11*b*, which comprises an end 31 of convex shape, able to touch the contact to be crimped 34, of which one edge is able to touch said contact to be crimped along a single segment 33 of said edge to form a concave part therein, or of jaw type 18*b* shown FIGS. 12*a* and 12*b* which comprises an end 36 of convex shape, able to touch the contact to be crimped 34, of which one edge is able to touch said contact to be crimped along two unconnected segments 35*a* and 35*b* of said edge to form two concave parts therein, for example according to standard MIL-C-22520.

Preferably, the four jaws of the first tier are arranged so that two adjacent jaws are offset from each other by an angle of substantially 90 degrees, and so that two jaws other than adjacent jaws lie diametrically opposite either side of the hole 6 in jaw support 10 able to receive the contact to be crimped.

The crimping tool 1 of the invention allows the first tier and second tier to be actuated simultaneously using the first handle 4 and the second handle 2. In this manner, it allows contact 34 to be crimped substantially simultaneously onto the electric core of the wire by the first tier and onto an insulating jacket of this wire by means of the second tier. Since in the above-mentioned preferred embodiments, the first tier is used to achieve crimping such that the section of the contact 34 comprises concave parts on its perimeter, and the second tier is used to achieve crimping such that the section of the contact is substantially circular, while reducing forces during the return or the crimping tool to rest position, the crimping tool 1 of the invention is therefore advantageously able to solve the problems of the prior art.

The invention claimed is:

1. A crimping tool to crimp a contact onto the end of a wire, said wire end including a stripped part where a conductor core of the wire is exposed, and an insulated part where the conductor core is covered by an insulating jacket, said contact including a hole coaxial to the longitudinal axis of said contact configured to receive both the stripped part and the insulated part of the wire end, said crimping tool comprising:

a first tier to crimp a first part of said contact onto the conductor core of the wire;

a second tier to crimp a second part of said contact onto the insulating jacket of the wire; and means for actuating said first and second tiers in substantially simultaneous manner; wherein:

said first and second tiers comprise crimping components configured to be moved in relation to the contact to be crimped, during crimping;

at least one of said first and second tiers comprises a cam cooperating with the crimping components of the tier under consideration and causing these crimping components to move and crimp the contact, during crimping; and at least one rotating element is arranged between a respective crimping component and said cam, the rotating element being movable between at least two positions with respect to the respective crimping component so that when the rotating element is in contact both with the crimping component and with said cam, a distance between said cam and one end of the respective crimping component configured to touch said contact during crimping, is different in said at least two positions.

2. A crimping tool as in claim 1, wherein during movement of the cam relative to the crimping components, in a first direction corresponding to crimping, said rotating element takes up a first position with respect to said respective crimping component, in which said distance is maximal, and during movement of the cam relative to the crimping components in a second direction opposite to the first, said rotating element takes up a second position with respect to said respective crimping component, in which said distance is minimal.

3. A crimping tool as in claim 1, wherein said second tier comprises means for crimping said contact such that said contact has a substantially elliptical section.

4. A crimping tool as in claim 3, wherein the second tier comprises two groups of two jaws such that:

the jaws of the first group have first ends configured to touch the contact to be crimped, said first ends having a shape substantially corresponding to a plane whose orientation is substantially tangent to said contact during crimping;

the jaws of the second group have second ends configured to touch the contact to be crimped, said second ends having a concave shape substantially corresponding to an arc of a cylinder smaller than a semi-cylinder;

the two jaws of the first group are arranged diametrically opposite either side of a hole in the jaw configured to receive the contact to be crimped;

the two jaws of the second group are arranged diametrically opposite either side of said hole in the jaw configured to receive the contact to be crimped;

the jaws of the second group are oriented at an angle of substantially 90 degrees with respect to the jaws of the first group.

5. A crimping tool as in claim 1, wherein the crimping components include jaws configured to be moved in a radial fashion to the contact to be crimped, during crimping.

6. A crimping tool as in claim 5, wherein said cam is rotatably mounted about a jaw support, said cam comprising a track cooperating with ends of the jaws to cause the jaws to move radially towards the contact to be crimped, during crimping, the jaws being slidingly mounted in grooves of the jaw support.

7. A crimping tool as in claim 6, wherein said at least one rotating element is arranged between one jaw end and said track, this rotating element possibly taking up at least two positions with respect to the jaw end under consideration, such that when this rotating element is in contact both with this jaw end and with said track the distance, between said track and another end of this jaw configured to touch said contact during crimping, is different in said at least two positions.

8. A crimping tool as in claim 7, wherein the ends of the jaws cooperating with the track are bevelled, the rotating elements being arranged between these bevelled ends and the track.

9. A crimping tool as in claim 8, wherein the bevelled end of a jaw is configured so that the distance between this jaw and the track of said cam is maximal at the rear of said jaw and minimal at the front of said jaw, the front and rear being considered with respect to the direction of movement of said cam in relation to the jaw support during crimping.

10. A crimping tool as in claim 7, wherein said cam track comprises a notch at each position of said track facing each jaw with which a rotating element is associated when said cam has reached its a travel limit relative to the jaw support, during crimping.

11. A crimping tool as in claim 10, wherein the depth of said notch in the track is:

at least equal to displacement of the jaw corresponding to said notch under effect of elastic deformation of the contact to be crimped, at the end of crimping, when this jaw is no longer subject to the forces applied by said rotating element; and less than the difference in distance, considered when projecting onto a straight line radial to the axis of the jaw support and passing through the jaw, between the positions taken up by the center of gravity of the rotating element in said first position and in said second position respectively.

12. A crimping tool as in claim 10, wherein the length occupied by said notch on the track is no more than substantially equal to the width of the jaw corresponding to said notch.

13. A crimping tool as in claim 6, wherein said track has a shape configured to allow a centrifugal radial movement of the jaws at the end of crimping so as to release these jaws from said contact.

14. A crimping tool as in claim 6, wherein the jaw supports are secured to a first handle and the cams are secured to a second handle, said first and second handles being common to the first tier and second tier.

15. A crimping tool as in claim 6, wherein said first tier comprises means for crimping said contact such that said contact has a section with concave parts on a perimeter of said section.

16. A crimping tool as in claim 15, wherein the first tier comprises four identical jaws such that:

two adjacent jaws are offset from each other by an angle of substantially 90 degrees;

two jaws other than adjacent jaws are arranged diametrically opposite either side of a hole in the jaw support configured to receive the contact to be crimped;

ends of said jaws configured to touch the contact to be crimped have a convex shape configured to indent concave deformations in said contact during crimping.

17. A crimping tool as in claim 1, wherein said rotating element is a substantially spherical bead.

18. A crimping tool as in claim 1, wherein said rotating element is a substantially cylindrical roller.

19. A crimping tool as in claim 18, wherein said roller is secured to a hinge pin coaxial to said roller and whose ends are configured to slide within rails secured to said jaw end.

20. A crimping tool as in claim 1, wherein said second tier comprises means for crimping said contact such that said contact has a substantially circular section.

21. A crimping tool as in claim 1, wherein said rotating element is movable between said two positions relative to said respective crimping component in contact with said rotating element along a direction of rotation of said cam.

22. A crimping tool as in claim 21, wherein said rotating element is movable between said two positions for a given angular position of said cam relative to said respective crimping component, a first of said two positions being occupied by said rotating elements during crimping and a second of said two positions being occupied by said rotating elements after crimping.

23. A crimping tool as in claim 22, wherein said respective crimping component in contact with said rotating element is radially movable at said given angular position of said cam relative to said respective crimping component.

24. A crimping tool as in claim 23, wherein said respective crimping component is configured to move to a radially outward position during crimping and to move to a radially inward position after crimping.

25. A crimping tool as in claim 1, wherein said rotating element is movable from a front of said respective crimping component to a rear of said respective crimping component, said front and rear being relative to a direction of movement of said cam during crimping.

* * * * *